(12) United States Patent
Judell

(10) Patent No.: US 12,712,663 B2
(45) **Date of Patent: *Aug. 18, 2026**

(54) SIMULTANEOUS TRANSMIT SIGNALS AND RECEIVE SIGNALS

(71) Applicant: RAYTHEON BBN TECHNOLOGIES CORP., Cambridge, MA (US)

(72) Inventor: Neil Judell, Cambridge, MA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,483

(22) Filed: Dec. 21, 2023

(65) Prior Publication Data

US 2024/0204911 A1 Jun. 20, 2024

Related U.S. Application Data

(63) Continuation-in-part of application No. 18/506,803, filed on Nov. 10, 2023.

(60) Provisional application No. 63/433,200, filed on Dec. 16, 2022.

(51) Int. Cl.
*H04L 1/00* (2006.01)

(52) U.S. Cl.
CPC .................................. *H04L 1/0034* (2013.01)

(58) Field of Classification Search
None
See application file for complete search history.

(56) References Cited

U.S. PATENT DOCUMENTS

| | | | | |
|---|---|---|---|---|
| 5,440,585 | A | 8/1995 | Partridge, III | |
| 6,725,409 | B1 * | 4/2004 | Wolf | H03M 13/2957 714/755 |
| 7,415,079 | B2 | 8/2008 | Cameron et al. | |
| 9,100,736 | B2 | 8/2015 | Jensen et al. | |
| 9,331,735 | B1 * | 5/2016 | Margomenos | H04B 1/525 |
| 10,225,112 | B1 | 3/2019 | Doane | |
| 10,348,394 | B1 * | 7/2019 | Bakr | H04L 12/4625 |
| 11,057,067 | B1 * | 7/2021 | Hickle | H04B 1/109 |

(Continued)

OTHER PUBLICATIONS

C. R. C. Nakagawa, S. Nordholm, and W.-Y. Yan, "Feedback Cancellation With Probe Shaping Compensation," IEEE Signal Process. Lett., vol. 21, No. 3, pp. 365-369, Mar. 2014.

(Continued)

*Primary Examiner* — Mujtaba M Chaudry
(74) *Attorney, Agent, or Firm* — CANTOR COLBURN LLP

(57) ABSTRACT

Simultaneous transmit signals and receive signals (STAR) circuit and method includes: an error correction circuit for receiving a receive signal and a transmit signal for transmission; a first input port for receiving the transmit signal; a second input port for receiving a modification signal; and an adder to add the transmit signal to the modification signal to generate a modified modification signal, wherein the modified modification signal is input to the error correction circuit, wherein the modification signal modifies the transmit signal to have energy orthogonal to the receive signal, and wherein the transmit signal is transmitted simultaneously with receiving the receive signal.

4 Claims, 6 Drawing Sheets

(56) References Cited

U.S. PATENT DOCUMENTS

2004/0039774 A1* 2/2004 Xu ........................ H04L 69/162 709/227
2004/0081193 A1* 4/2004 Forest ................. H04L 12/4035 370/458
2004/0240590 A1* 12/2004 Cameron ................ H04L 1/005 375/340
2008/0170515 A1 7/2008 Masuda et al.
2011/0150257 A1 6/2011 Jensen et al.
2012/0140965 A9 6/2012 Jensen et al.
2012/0198399 A1* 8/2012 Safarpour ........... G06F 30/3323 716/106
2013/0070936 A1 3/2013 Jensen et al.
2014/0003547 A1* 1/2014 Williams ............ H04L 27/2647 375/267
2014/0086160 A1* 3/2014 Kim ...................... H04W 52/00 370/329
2016/0305910 A1* 10/2016 Driscoll ............... A61B 5/0037
2017/0311091 A1 10/2017 Nakagawa et al.
2018/0241255 A1* 8/2018 Leabman ................ H02J 50/40
2020/0252115 A1* 8/2020 Paramesh ................ H04B 1/18
2021/0132211 A1* 5/2021 McCormick .......... G01S 13/538
2022/0045554 A1* 2/2022 Leabman ................ H02J 50/20
2024/0205047 A1 6/2024 Judell

OTHER PUBLICATIONS

Nakagawa, Ph.D. (Jun. 2014) "Dissertation, Curtin University, Control of Feedback for Assistive Listening Devices," School of Electrical and Computer Engineering, This thesis is presented for the Degree of Doctor of Philosophy of Curtin University, pp. 1-155.
European Search Report for Application No. 23213770.3, mailed May 16, 2024, 10 pages.
Extended European Search Report for Application No. 24222272.7, mailed May 19, 2025, 9 pages.

* cited by examiner

SIMULTANEOUS TRANSMIT SIGNALS AND RECEIVE SIGNALS

CROSS-REFERENCE TO RELATED APPLICATIONS

This patent application is a Continuation-In-Part of U.S. patent application Ser. No. 18/506,803, filed on Nov. 10, 2023 and entitled "Improved Simultaneous Transmit Signals and Receive Signals," which claims the benefits of U.S. Provisional Patent Application Ser. No. 63/433,200, filed on Dec. 16, 2022 and entitled "Improved Simultaneous Transmit Signals and Receive Signals," the entire contents of which are hereby expressly incorporated by reference.

FIELD

The disclosure generally relates to electronic transceivers and more specifically to an improved simultaneous transmit and receive signals.

BACKGROUND

Simultaneous Transmit And Receive (STAR) is a technology that has been under development for at least the past decade. Some significant successes have taken place in radio frequency (RF) STAR permitting STAR implementations of WiFi, for instance. In general, for many communication applications, the benefits of STAR do not outweigh the additional costs. This is because in these applications communications tend to occur in bursts, and there is generally a low enough duty factor that media access methods other than STAR are nearly as efficient as STAR. In acoustic environments, however, there has been some successful utilization of STAR. STAR becomes important when constant or near-constant signaling is a requirement, as in some position, navigation, timing (PNT), and hearing aid applications.

For example, in noise-cancelling headphones, a mechanical isolation system (ear cups and shell) provides passive noise reduction, while an exterior microphone senses the noise-producing environment, and a speaker element produces anti-noise from the adaptive cancellation system, as well as other desired audio (music for consumer headphones, or aircraft radio audio for pilot headsets), and finally, an microphone on the interior of the earcup senses the combined noise, anti-noise and desired audio near the user's ear. A block diagram of an adaptive cancellation system is shown in FIG. 1.

FIG. 1 illustrates block diagram of an adaptive cancellation system, according to prior art. As shown, a Noise source is input to an exterior microphone and a Passive noise reduction circuit. The microphone response signal is input to an estimated anti-noise response circuit and a correlator. The output of the correlator is also input to the estimated anti-noise response circuit. The output of the Noise adjustment circuit along with the output of the Passive noise reduction circuit and a desired signal are summed by an adder. The output of the adder is also input to the correlator. The correlator minimizes the power in the internal microphones using a gradient descent method.

The desired source and output of the estimated anti-noise response are digital signals, added and sent via a D/A converter to a speaker. The noise source has an acoustic path through air, earcup, etc. and adds acoustically to the other signals. The result is sampled via an interior microphone. In everyday use, an adaptive mechanism changes the time-varying linear response of the estimated noise response to minimize the mean-squared power produced at the out of the interior microphone. Standard statistical methods for minimization include Kalman Filter, Least Mean Squares (LMS) and Recursive Least Squares. All of these methods are variations of gradient descent methods. The gradient is proportional to the correlation between the exterior microphone signal and the output of the interior microphone.

For example, in a PNT node which must continuously receive signals from other nodes while producing its own continuous transmission, such nodes would be using Code Division Multiple Access (CDMA) with different semi-orthogonal codes. The local signal from self-transmission would be far larger than the received distant signals due to $1/R^2$. Usually, the ratios are large enough that the local signal swamps the interference limit for the distant signals. Therefore, it becomes important to cancel out the self-signal. The basic STAR architecture is shown in FIG. 2.

FIG. 2 shows a simplified block diagram for STAR architecture, according to prior art. As shown, the system has an "our signal" to be transmitted, as the output. The "our signal" arrives at the receiver end via the self-transmission response as noise signal, which accounts for transmitter and receiver transfer functions, delay, multipath, etc. The distant source signal also appears at the receiver as the input, producing the receiver signal. As shown, an estimated self-transmission response is applied to the "our signal" and subtracted from the received signal, to isolate the distant source signal. The more closely the estimated self-transmission response matches the actual self-transmission response, the better the cancellation of the self-signal, which makes the receiver better able to duplicate the distant source signal. The estimated self-transmission is typically implemented as a digital filter, most frequently as a finite impulse response (FIR) filter. The FIR filter applies gain to delayed copies of the transmission signal, emulating the multipath propagation from transmit to receive.

Having good knowledge of the distant source signal is important for many applications. In a PNT node, the timing of this distant source signal is used to determine the location of the system under discussion. This is then used to transmit its own location using the transmitter, helping form a network of location reference nodes. If the system is a hearing aid, that distant source is exactly what the hearing aid is going to amplify—with the amplified output being the self-signal. If the system does not do a good job of cancellation of the self-signal, then a feedback whine can result. As shown by the dashed lines, block 202 that includes the estimated self-transmission response, self-transmission response and the correlator is referred to as a noise cancellation circuit.

The system gain function is the transfer function from the self-signal back to the receiver input. In most applications, there is a direct path from transmitter element to receiver element, but there are also other paths from transmitter to receiver—by bouncing off walls, ceilings, waves, other nearby objects. These additional paths are called multipath. In general, system gains—particularly multipath—are time varying, requiring that the estimated self-transmission response be adaptively updated. This is generally achieved by use of correlating the "our signal" with the estimated distant source signal (the internal signal at the receiver) via least mean-squares (LMS), recursive least-square (RLS) or similar gradient descent method.

Adaptation must be over a period of long enough duration that the "our signal" and distant source signals are uncorrelated. This becomes a problem when either a faster adaptation rate is required, due to time-varying self-transmission response, or when there is longer-term correlation between the "our signal" and the distant source signal. An example of long-term correlation might be a very high frequency omni-directional range (VOR)—like system, where the distant source is a reference multitone, and the "our signal" is a copy of that signal, but with different phase applied. Such a system has effectively stationary correlation between the two signals, and a system such as shown in FIG. 1 would never converge on a good solution for cancellation.

FIG. 3 illustrates a probe-based STAR system, according to prior art. As depicted, a probe signal is added to the "our signal" (of FIG. 2) prior to transmission. This architecture attempts to address the correlation problem between "our signal" and the distant source. Correlation for the adaptation loop is between the probe signal and the estimated distant source. Typically, the probe signal is a white, zero-mean, identically distributed Gaussian series. This series is uncorrelated with either the "our signal" or the distant source. As shown, the probe signal here in only correlated with the Receiver signal but is uncorrelated with the noise. This may solve the problem of correlation between "our signal" and the distant source.

However, an important issue is that one generally does not want the probe to be of large amplitude, because it will interfere with the "our signal" that is transmitted. Therefore, the amount of power in the probe signal needs to be made very small with respect to the power in the "our signal." This creates a problem, that is, while the probe signal and estimated distant source signal will be uncorrelated in the long run, the convergence to solution is greatly slowed in the presence of any estimation errors if "our signal" is large, or if the distant source is not so distant, because of stronger interference. Similarly, block 302 that includes the estimated self-transmission response, self-transmission response and the correlator is referred to as a noise cancellation circuit, as shown by the dashed lines.

Generally, the way to handle this situation is to slow down the adaptation rate in the presence of large signals. This may work, if the adaptation rate does not become slower than the rate of change of the actual self-transmission response. Additionally, short-term correlations between the probe and other signals can cause drift in the solutions.

SUMMARY

In some embodiments, the present disclosure is directed to a simultaneous transmit signals and receive signals (STAR) circuit. The circuit includes: an error correction circuit for receiving a receive signal and a transmit signal for transmission; a first input port for receiving the transmit signal; a second input port for receiving a modification signal; and an adder to add the transmit signal to the modification signal to generate a modified modification signal, wherein the modified modification signal is input to the error correction circuit, wherein the modification signal modifies the transmit signal to have energy orthogonal to the receive signal, and wherein the transmit signal is transmitted simultaneously with receiving the receive signal.

In some embodiments, the present disclosure is directed to a method for STAR. The method includes: receiving a receive signal and a transmit signal for transmission; receiving the transmit signal; receiving a modification signal; and adding the transmit signal to the modification signal to generate a modified modification signal, wherein the modified modification signal is input to an error correction circuit, wherein the modification signal modifies the transmit signal to have energy orthogonal to the receive signal, and wherein the transmit signal is transmitted simultaneously with receiving the receive signal.

In some embodiments, the present disclosure is directed to a simultaneous transmit signals and receive signals (STAR) circuit. The circuit includes: means for receiving a receive signal and a transmit signal for transmission; means for error correcting the receive signal and the transmit signal; means for receiving the transmit signal; means for receiving a modification signal; and means for adding the transmit signal to the modification signal to generate a modified modification signal, wherein the modified modification signal is input to the means for error correcting, wherein the modification signal modifies the transmit signal to have energy orthogonal to the receive signal, and wherein the transmit signal is transmitted simultaneously with receiving the receive signal.

BRIEF DESCRIPTION OF THE DRAWINGS

A more complete appreciation of the disclosure, and many of the attendant features and aspects thereof, will become more readily apparent as the disclosure becomes better understood by reference to the following detailed description when considered in conjunction with the accompanying drawings in which like reference symbols indicate like components.

DETAIL DESCRIPTION

In some embodiments, the present disclosure improves the adaptation rate slow down by introducing a new signal, in addition to the probe signal. This modification signal ("X signal") also minimizes expected correlation with the distant source signal.

Figure 1:
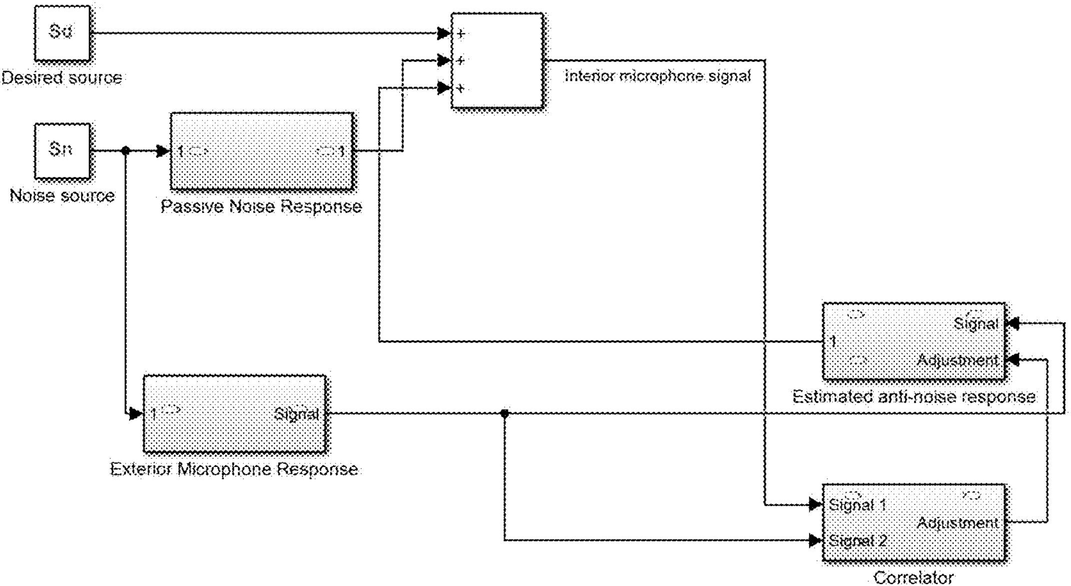
FIG. 1 illustrates block diagram of an adaptive cancellation system, according to prior art.
Figure 2:
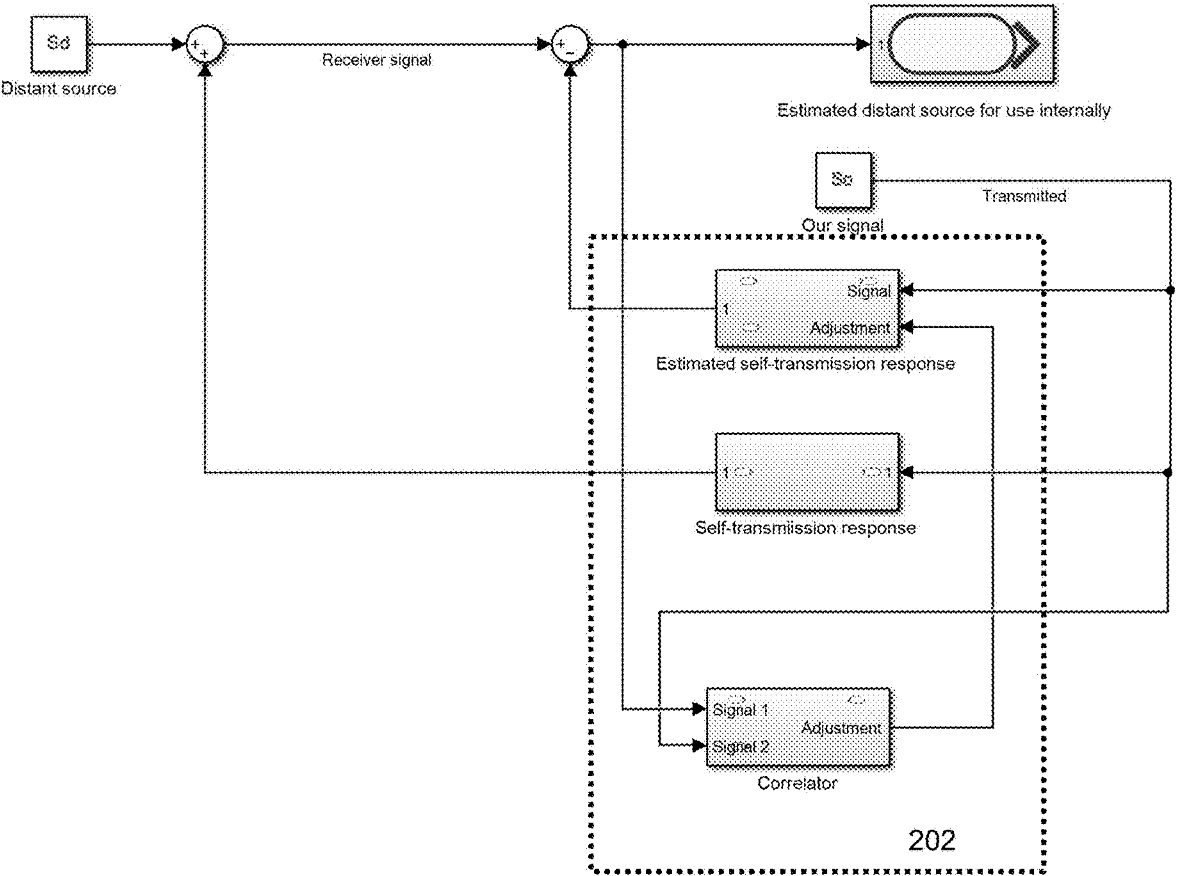
FIG. 2 shows a simplified block diagram for Simultaneous Transmit And Receive (STAR) architecture, according to prior art.
Figure 3:
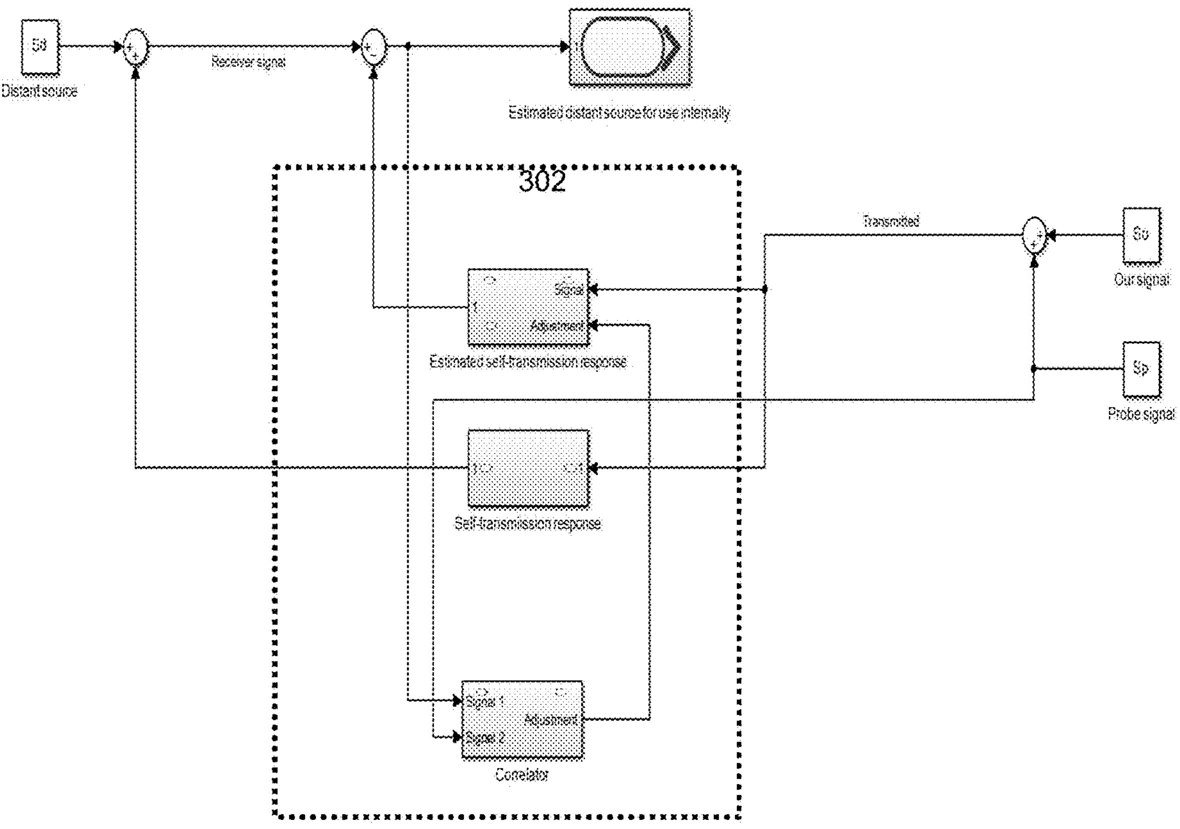
FIG. 3 illustrates a probe-based STAR system, according to prior art.
Figure 4:
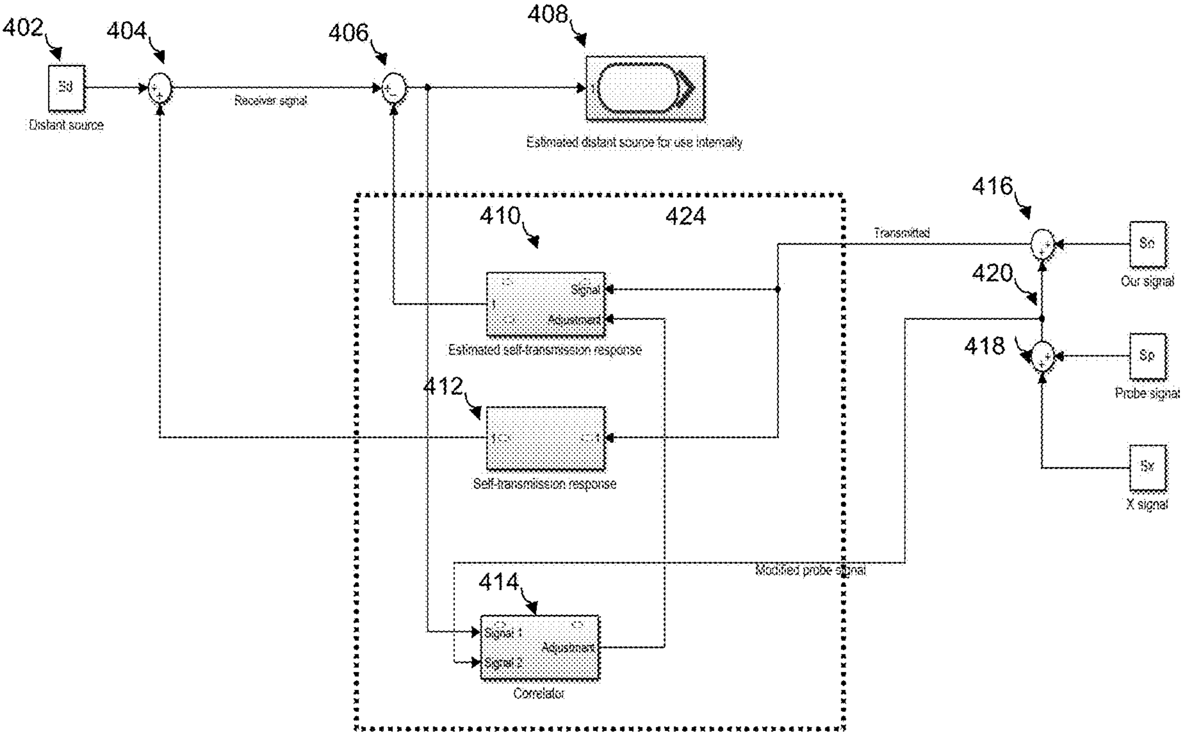
FIG. 4 depicts a modified probe STAR system, according to some embodiments of the present disclosure.

FIG. 4 depicts a modified probe STAR system, according to some embodiments of the present disclosure. As depicted, as distance source signal 402 is added to an output of a self-transmission response circuit 412 to yield a receive signal. An output of an estimated self-transmission response circuit 410 is subtracted from the received signal (subtractor 406) to generate an estimated distance source 408 for use internally. In a communications system, the estimated distant source is a signal to be demodulated and decoded. The self-signal cancellation provides adequate signal-to-interference level to permit decoding. In a navigation repeater, the distant source signal is amplified, phase shifted, and replayed—generating the "our Signal," that is the signal to be transmitted. In a hearing aid, the distant source signal is amplified, filtered and played into the user's ear as the "Our Signal."

As shown a "modification signal" (X signal), received from an input port Sx, is added to a probe signal received from an input port Sp (by adder 418), the sum of which (signal 420) is then added to our signal, which is received from an input port So, (by adder 416) to form the transmit signal 422. The probe signal may be added as a zero-mean, white, independent or identically distributed (IID) Gaussian sequence. The probe signal is then modified by adding the "X signal" to it. The gradient for adaptation is computed by correlating the signal output from summing junction 406 against the modified probe signal 420 by the correlator 414. In other words, the X signal eliminates the short-term fluctuations in the Transmit signal 422 causing it to converge faster. As shown by the dashed lines, the estimated self-transmission response 410, self-transmission response 412 and the correlator 414 is referred to as a noise cancellation circuit 424. However, this makes the X signal prone to discovery and/or jamming.

Normally, correlation and adaptation occur as a block process, in which the length of the block is significantly larger than the number of delay taps in the estimated self-transmission response. The gradient is computed as:

$$\text{gradient}(n, m) = \sum_{i=0}^{BlockLength-1} ModifiedReceivedSignal\,(n-i+m) ModifiedProbeSignal(n-i)$$

This is computed at sample number n, for each delay m ranging from 0 through the number of delays used in the response minus 1. The block length can vary from 1 to very large number. In some embodiments, the block length is at least as large as the total number of constraints. Block lengths are usually a function of the type of data processing equipment. Software-defined radios are well-suited to these types of applications and have block lengths that depend on the radio characteristics, internal software and speed of interfaced computing equipment. Block length can be set by the designer to meet a computation loading requirement—longer block lengths mean the computation is performed less frequently, resulting in lower computation loads. Very short block lengths tend to introduce unintended variability in the cancellation estimates, resulting in poor cancellation. For rapidly varying systems, block lengths on the order of 10% of the variation time of the system seem to perform best. This 10% length typically meets the condition of being significantly larger than the number of constraints, resulting in good behavior.

The X signal is computed so that the sum of the X signal and the probe signal is fully orthogonal to the "our signal" and to minimize expected correlation with the distant source signal, while simultaneously minimizing the power in the X signal itself. To wit, we find:

$$\min(|X|^2) \text{ such that}$$

$$\sum_{i=0}^{BlockLength-1} OurSignal\,(n-i+m)\, ModifiedProbeSignal\,(n-i) = 0$$

There are at least two cases of interest. In the first case, the effective dimensionality of the distant signal source is less than half of the block length—for instance a two-tone reference wave will be of dimensionality 4 or less, I and Q components at the two frequencies. Here all distant source block vectors can be reconstructed from a linear combination of 4 or fewer basis vectors.

In the second case, a restricted set of unity-magnitude orthogonal vectors that best represents the distant source via the Karhunen-Loéve Transform (KLT) are computed. Also, the autocovariance matrix for the distant signal is computed and the eigenvectors corresponding to the largest eigenvalues up to the number of taps in the estimated self-transmission response are taken. As known, KTL is a representation of a stochastic process as an infinite linear combination of orthogonal functions, analogous to a Fourier series representation of a function on a bounded interval.

In either case, the vectors obtained by the set is denoted as: $\vec{v}_{dj}$ where the d designates "distant source" and the j is the index for the vector, running from 1 to either the dimensionality of the basis or the number of taps. The "our signal" can also be vectorized, where each vector has elements equal to the number of taps. The first vector has the latest "our signal" sample at the top, and the last element is the sample from block length ago. The second vector begins with the net-to-the-latest "our signal" sample and continues down, and so on for a number of vectors equal to the number of taps. This forms the set: $\vec{v}_{oi}$ where the o designates "our signal" and the i is the index of the vector.

The probe signal and X signal can also be vectorized similarly. The X signal is now selected in such a manner that the magnitude of the X vector is minimized, so that the modified probe vector is orthogonal to the "our signal" vectors and the distant source representation vectors. The modified probe vector itself is not minimized, because this will always yield the trivial solution of a zero vector for the modified probe. However, this solution will result in the magnitude of the X vector being less than or equal to the magnitude of the original probe vector. This implies that the modified method increases the overall probe signal by no more than 6 dB.

Figure 5:
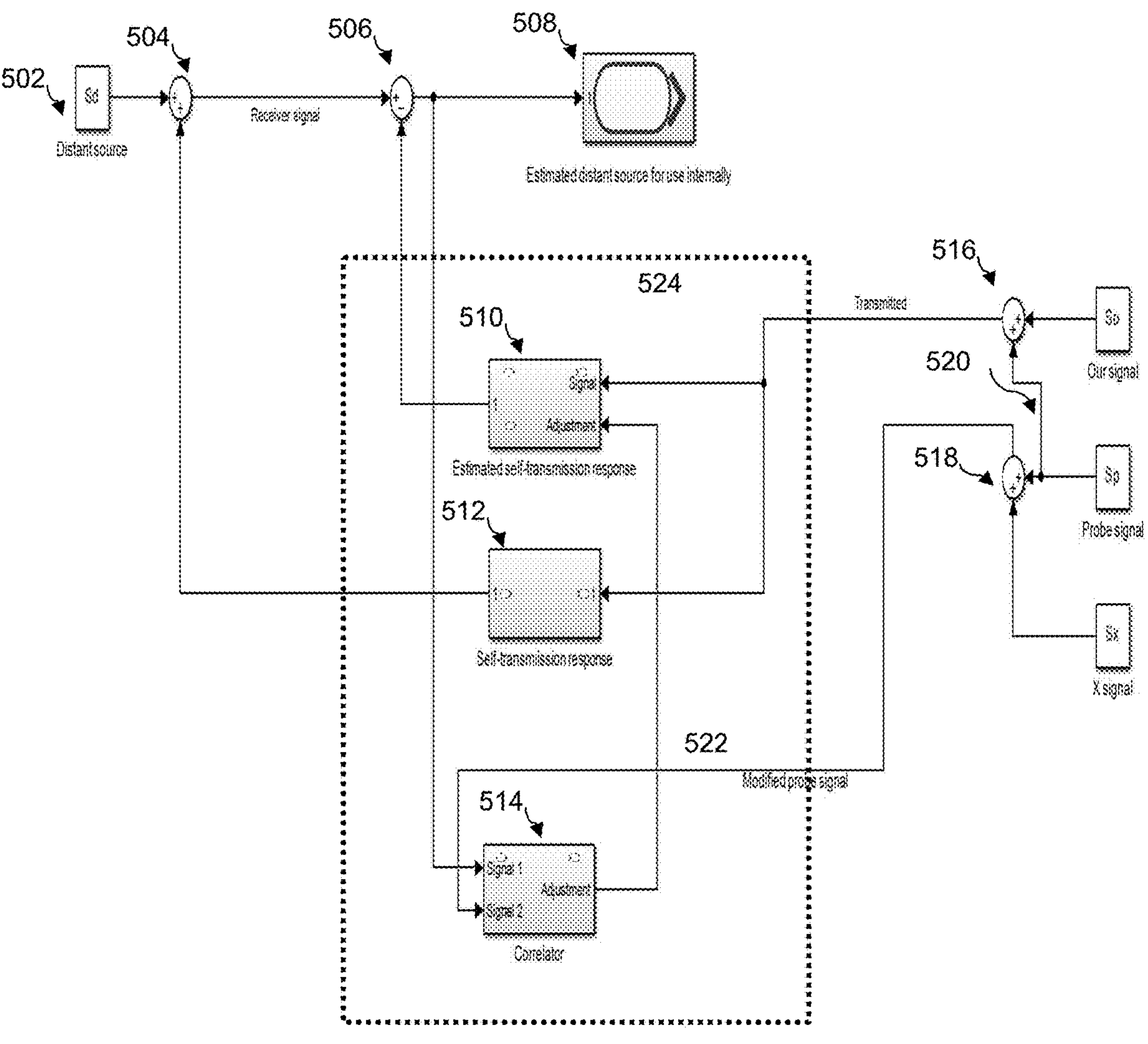
FIG. 5 depicts an unmodified probe, modified correlation STAR system, according to some embodiments of the present disclosure.

FIG. 5 depicts an unmodified probe, modified correlation STAR system, according to some embodiments of the present disclosure. Components 502, 504, 506, 508, 510, 512, 514 and 524 are similar to their respective components in FIG. 4 and their functions are also similar. However, in these embodiments, the probe signal is unmodified by the "modification signal" (X signal), where the probe signal is added to the X signal (adder 518) to modify the correlation by being input to the correlator circuit 514, as shown. That is, the probe signal added to the output need not be the modified probe, but simply the original probe. Here, the correlator reference should be as orthogonal as possible to both the desired transmission and the expected distant signal. As shown by the dashed lines, the estimated self-transmission response 510, self-transmission response 512 and the correlator 514 is referred to as a noise cancellation circuit 524.

The X signal is then added to the probe signal 520 (by adder 518), the sum of which (signal 522) is input to the noise cancellation circuit 524 (correlator 514). The probe signal 520 is also added (by adder 516) to our signal (the signal to be transmitted) the sum of which (Transit signal) is also input to the noise cancellation circuit 524 (correlator 514). The probe signal 520 may be added as a zero-mean, white, independent or identically distributed (IID) Gaussian sequence. In these embodiments, the probe signal 520 is then modified by adding the X signal to it. The gradient for adaptation is computed by correlating the signal output from summing junction 506 against the modified probe signal 520. In other words, the X signal eliminates the short-term fluctuations in the Transmit signal causing it to converge faster. In some embodiments, the X signal may be made internal to the architecture/circuit to prevent detection or jamming.

This architecture/circuit has several advantages over the architecture shown in FIG. 4. This improved architecture makes the added probe fully configurable and predictable—independent of the distant source or desired transmission. It also makes amplifier design, receiver design and exploitation of the transmitted signal simpler and more reliable. Moreover, by delaying computation of the probe modification signal until beginning of transmission, the entire computation can be pipelined and therefore significantly simplifying computational loading.

The X signal can be computed, for example, as a minimization under Lagrangian multiplier constraints as shown below.

$$J = \text{trace}\left(\vec{v}_x\vec{v}_x^t + \sum_j \gamma_j \vec{v}_{dj}(\vec{v}_p + \vec{v}_x)^t + \sum_i \lambda_i \vec{v}_{oi}(\vec{v}_p + \vec{v}_x)^t\right) \quad \text{(Eq. 1)}$$

under the constraint sets:

$$(\vec{v}_p + \vec{v}_x)^t \vec{v}_{dj} = 0$$

$$(\vec{v}_p + \vec{v}_x)^t \vec{v}_{oi} = 0$$

Taking the gradient of J with respect to the x vector and solving for zero, we find:

$$\vec{v}_x = \frac{-1}{2}\left(\sum_j \gamma_j \vec{v}_{dj} + \sum_i \lambda_i \vec{v}_{oi}\right)$$

Substituting this back into the constraint sets:

$$\left(\vec{v}_p - \frac{1}{2}\left(\sum_j \gamma_j \vec{v}_{dj} + \sum_i \lambda_i \vec{v}_{oi}\right)\right)^t \vec{v}_{dk} = 0$$

$$\left(\vec{v}_p - \frac{1}{2}\left(\sum_j \gamma_j \vec{v}_{dj} + \sum_i \lambda_i \vec{v}_{oi}\right)\right)^t \vec{v}_{om} = 0$$

Rewriting:

$$\sum_j \gamma_j \vec{v}_{dj}^t \vec{v}_{dk} + \sum_i \lambda_i \vec{v}_{oi}^t \vec{v}_{dk} = 2\vec{v}_p^t \vec{v}_{dk}$$

$$\sum_j \gamma_j \vec{v}_{dj}^t \vec{v}_{om} + \sum_i \lambda_i \vec{v}_{t_{oi}} \vec{v}_{om} = 2\vec{v}_p^t \vec{v}_{om}$$

Where, $\vec{v}_x$ is the vector formed by the X signal with the first element being x(n), second element being x(n−1) and so on down to x(n-(BlockLength−1)), $\vec{v}_p$ is similarly defined for the probe signal, $\vec{v}_{oi}$ is the i'th own signal vector made up of OwnSignal(n+i), OwnSignal(n−1+i), and so forth to OwnSignal(n-(BlockLength−1)+i), $\vec{v}_{dj}$ are optional vectors that are used to characterize the distant source signal—they will be chosen to have a large expected correlation to the distant source. Each vector is BlockLength-dimensional, and j is the index for listing each vector. There may be none—if the distant signal cannot be characterized, or there may be many. $\gamma_j$ and $\lambda_i$ are the Lagrangian multipliers used for constrained optimization and are determined by solving for the gradient equaling zero under the constraint sets.

This way, the STAR circuits of FIGS. 4 and 5 receive a receive signal and a transmit signal; receive a probe signal, a transmit signal for transmission, and a modification signal. The probe signal is added to the modification signal to generate a modified probe signal. The modified probe signal is then input to the error correction circuit. The modification signal modifies the probe signal to be orthogonal to the transmit signal and to minimize expected correlation with the receive signal to generate a final transmit signal.

In some embodiments, the constraints are chosen to make the modified probe signal orthogonal to the Our signal vectors and the distant source characterization vectors. This constraint set forces the gradient computation to be independent of the Our signal and distant signal.

This leads to a non-trivial set of linear equations in the gammas and lambdas in terms of the probe signal, the "our signal" and the basis/KLT of the distant signal. It is possible that the rank of the linear equations' matrix may be deficient. It is sufficient to reduce the rank of the matrix and use a reduced set of gammas and labmdas, setting the others to zero—which results in a minimization of the X vector while maintaining the necessary orthogonal conditions. This gives a well-conditioned means to obtain the desired modified probe signals.

Figure 6:
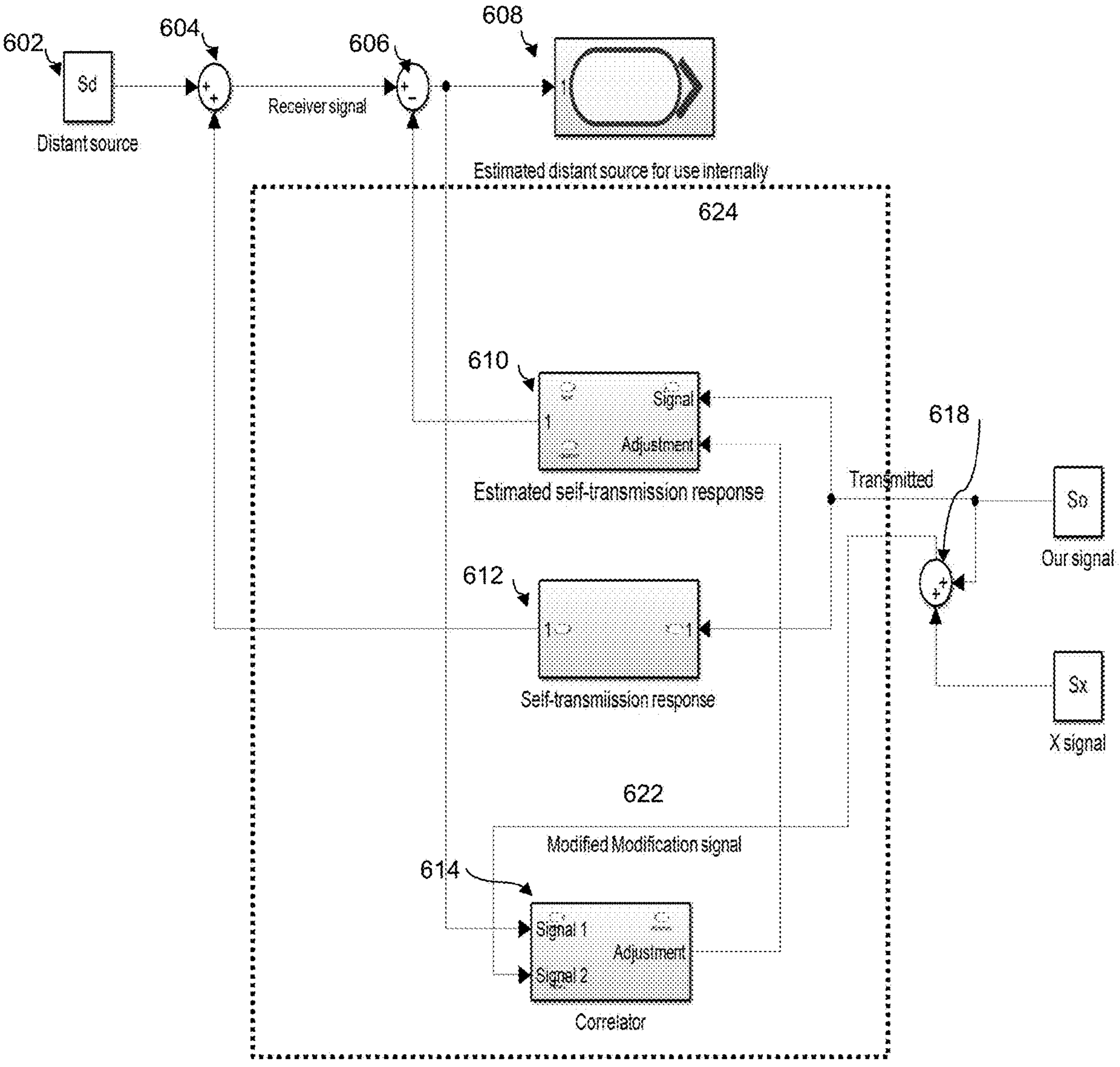
FIG. 6 depicts a modified correlation STAR system without a probe signal, according to some embodiments of the present disclosure.

FIG. 6 depicts a modified correlation STAR system without a probe signal, according to some embodiments of the present disclosure. In some embodiments, where the probe signal is generally far smaller than the "our signal", and the distant signal is, at best, weakly characterized, the embodiments in FIGS. 4 and 5 cover self-signal cancellation employing an own-signal, probe signal, an X signal for modifying the probe signal, and a distant signal. For example, in a case where a continuously transmitting Position Navigation and Timing (PNT) source, the architecture/circuit of FIG. 5 may not behave optimally. For instance, a source may be transmitting a code division multiple access (CDMA) signal. In these situations, it is likely desirable to be able to receive CDMA signals from other PNT sources within the system at the same time. A characteristic of such system is that the signals received from distant sources have the following properties:

1. The arrival of these signals is known to some degree of precision. Small variations in this timing govern the corrections within the system.
2. The signals themselves can be characterized using a small number of vectors for each distant source—the CDMA base sequence for each source, with time shifts over the expected range of arrival time variations.
3. Typically, the phase or amplitude of these arrivals will be unknown and will encode information from the distant sources—however this vector space is still spanned by the small number of vectors from item 2 above.

In FIG. 6, components 602, 604, 606, 608 and the noise cancellation circuit 624 (including the estimated self-transmission response 610, self-transmission response 612 and the correlator 614) are similar to their respective components in FIGS. 4 and 5. However, in the embodiments depicted in FIG. 6 differ from those shown in FIG. 5, the "Our signal" has been removed and the "Probe signal" has been renamed as "Our signal." As shown, the (new) Our signal is modified by the "modification signal" (X signal), where the Our signal is added to the X signal (by adder 618) to modify the correlation by being input to the correlator circuit 614 as a modified modification signal 622. In these embodiments, the Our signal is transmitted as the transmit signal.

The original architecture shown in FIG. 5 minimized Equation 1 (Eq. 1) under the two constraint set equations:

$$(\vec{v}_p + \vec{v}_x)^t \vec{v}_{dj} = 0$$

$$(\vec{v}_p + \vec{v}_x)^t \vec{v}_{oi} = 0$$

The first constraint set equations orthogonalize the "Probe signal" plus "X signal" from the original architecture (of FIG. 5) against the vectors describing the distant signal. The second constraint set equations orthogonalize the "Probe signal" plus "X signal" from the original architecture against the "Our signal" vectors from the original architecture. Since the original "Our signal" is removed, as described in the original architecture, then the second constraint set equations no longer are meaningful and can be ignored. Additionally, the summation inside the trace equation (Eq. 1) in terms of the i indices may also be omitted. Since the original "Probe signal" in the original architecture is renamed as the new "Our signal," then one can similarly rename the vectors in the trace equation and the constraint set equations. Thus, Eq. 1 is minimized only under the first constraint set equations $(\vec{v}_o + \vec{v}_x)^t \vec{v}_{dj} = 0$.

The STAR circuit of FIG. 6 includes an error correction circuit 624 for receiving a receive signal and a transmit signal for transmission; a first input port for receiving the transmit signal; a second input port for receiving a modification signal; and an adder 618 to add the transmit signal to the modification signal to generate a modified modification signal 622. The modified modification signal is input to the error correction circuit and the modification signal modifies the transmit signal to have energy orthogonal the receive signal. The transmit signal is transmitted simultaneously with receiving the receive signal.

In these embodiments, the methodology of the of the original architecture still applies, where excellent gradient computations and rapid convergence to cancellation are obtained. Additionally, short-term correlation of the transmitted signal and distant sources is removed, without the need for a special probe signal.

The embodiments illustrated in FIG. 6 perform best under the following conditions:

1. The distant signals need to be characterized by a smaller number of vectors in the sense of the original architecture.
2. The signal to be transmitted needs to have significant energy orthogonal to the distant signals. For example, trigonometric waveforms at the same frequency as distant sources would fail, while CDMA vectors would succeed)

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. A simultaneous transmit and receive (STAR) circuit comprising:

a receiver to receive an input signal from a distant source and that also receives a locally transmitted (self) signal, wherein the locally transmitted (self) signal is an output of the STAR circuit that is created based on an internal transmitted signal, wherein the receiver adds the locally transmitted (self) signal to the input signal and produces a receiver signal;

an estimated self-transmission response circuit that receives the locally transmitted signal and creates an estimate of the locally transmitted (self) signal, wherein the locally transmitted (self) signal is transmitted by the STAR circuit simultaneously with the receiver receiving the input signal, wherein the locally transmitted (self) signal is a convolution of the internal transmitted signal with an impulse response of the estimated self-transmission response circuit;

an adder that removes the estimate of the locally transmitted (self) signal from the receiver signal to produce an estimated distance source signal;

a means for creating a modification signal;

a modification signal adder that adds the modification signal to the internally transmitted signal to generate a modified modification signal, wherein the modification signal modifies the estimated transmitted signal to have energy orthogonal to the distant source signal to reduce short-term correlation between the modified modification signal and the distant source signal and thereby improve convergence of the self transmission estimate;

a correlator that creates an adjustment signal, wherein the correlator creates the adjustment signal from the estimated distance source signal and the modified modification signal; and an estimated self-transmission response circuit that creates the estimate of the self transmission signal based on the internal transmitted signal and the adjustment signal.

2. The STAR circuit of claim 1, wherein the modification signal eliminates short-term fluctuations in correlation between the transmitted signal and the modification signal.

3. The STAR circuit of claim 1, wherein the correlator performs correlation and adaptation as a block process.

4. The STAR circuit of claim 1, wherein the transmitted and modification signals are vectorized similarly in such a manner that a magnitude of a vector of the modification signal is minimized.

* * * * *